United States Patent
Ghosh et al.

(10) Patent No.: US 11,257,065 B1
(45) Date of Patent: Feb. 22, 2022

(54) VEHICLE BASED TRANSACTIONS

(71) Applicant: Wells Fargo Bank, N.A., San Francisco, CA (US)

(72) Inventors: Parul Ghosh, Bangalore (IN); Shanmukeswara Rao Donkada, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 38 days.

(21) Appl. No.: 16/167,070

(22) Filed: Oct. 22, 2018

(51) Int. Cl.
*G06Q 20/32* (2012.01)
*G06Q 20/26* (2012.01)
*G06Q 20/40* (2012.01)

(52) U.S. Cl.
CPC ......... *G06Q 20/3278* (2013.01); *G06Q 20/26* (2013.01); *G06Q 20/3274* (2013.01); *G06Q 20/40145* (2013.01)

(58) Field of Classification Search
CPC ............... G06Q 20/3278; G06Q 20/26; G06Q 20/3274; G06Q 40/45; G06Q 40/00; G06Q 20/405; G06Q 20/00; G06Q 20/40; G08G 1/065; G06K 5/00; G06K 19/0704; G06K 9/74

See application file for complete search history.

(56) References Cited

U.S. PATENT DOCUMENTS

| | | | |
|---|---|---|---|
| 5,459,304 A | 10/1995 | Eisenmann | |
| 5,902,985 A | 5/1999 | Bos et al. | |
| 6,087,963 A | 7/2000 | Kobayashi et al. | |
| 6,263,316 B1 | 7/2001 | Khan et al. | |
| 6,310,542 B1 | 10/2001 | Gehlot | |
| 6,366,220 B1* | 4/2002 | Elliott | G06Q 10/087 340/10.1 |
| 6,547,133 B1 | 4/2003 | Devries et al. | |
| 6,609,655 B1* | 8/2003 | Harrell | G07B 15/063 235/375 |
| 6,661,352 B2 | 12/2003 | Tiernay et al. | |
| 7,379,897 B2 | 5/2008 | Pinkus | |
| 7,408,480 B2 | 8/2008 | Woo et al. | |
| 7,583,980 B2 | 9/2009 | Monsacre | |
| 7,640,185 B1* | 12/2009 | Giordano | G06Q 20/208 705/23 |
| 8,407,144 B2 | 3/2013 | Roberts et al. | |
| 9,213,973 B2* | 12/2015 | Hurt | G06Q 20/20 705/13 |
| 9,754,201 B2* | 9/2017 | Batra | G01M 5/00 |

(Continued)

*Primary Examiner* — Scott C Anderson
*Assistant Examiner* — Matthew Cobb
(74) *Attorney, Agent, or Firm* — Womble Bond Dickinson (US) LLP (57) ABSTRACT

The innovation disclosed and claimed herein, in one aspect thereof, comprises systems and methods of vehicle based transactions. The innovation associates a tag with a financial account and a vehicle. The financial account is associated with a customer that is associated with the vehicle. The tag is readable to perform associated financial functions. The tag is scanned with a reader. The reader is associated with the entity authorized to make charges to the financial account. Security controls are applied for the tag. The security controls dictate a charge type or authorized creditor for executing transactions. A financial transaction is executed between an entity and the customer using the tag associated with the financial account.

16 Claims, 6 Drawing Sheets

(56) References Cited

U.S. PATENT DOCUMENTS

| | | | | |
|---|---|---|---|---|
| 10,504,094 B1* | 12/2019 | Gaudin | ............... | G06Q 20/36 |
| 10,769,392 B1* | 9/2020 | Gravelle | ............ | G06K 19/0716 |
| 2008/0010202 A1* | 1/2008 | Schwarz | ............... | G06Q 20/04 |
| | | | | 705/41 |
| 2009/0024525 A1* | 1/2009 | Blumer | ............... | G06Q 20/327 |
| | | | | 705/41 |
| 2009/0060395 A1* | 3/2009 | Weiss | ............... | G06Q 20/10 |
| | | | | 382/313 |
| 2011/0213709 A1* | 9/2011 | Newman | ............... | G06Q 20/40 |
| | | | | 705/44 |
| 2014/0279565 A1 | 9/2014 | Trump et al. | | |
| 2016/0364726 A1* | 12/2016 | Lopez | ............... | G06Q 20/405 |

\* cited by examiner

VEHICLE BASED TRANSACTIONS

BACKGROUND

Customers spend increasingly more time in their vehicles. Due to the increase, vehicle based costs are becoming more commonplace. Customers spend more money to service the vehicle, purchase insurance, tires, tolls, parking, fuel, food and/or the like. Vehicle expenditures are becoming more difficult to track. There is need for a seamless transaction interface for vehicle based transactions.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of vehicle based transactions. A method of the innovation can include affixing a tag to a vehicle, the tag is readable to perform associated financial functions. The tag is associated with a financial account and the vehicle, the financial account is associated with a customer that is associated with the vehicle. A financial transaction is executed between an entity and the customer using the tag associated with the financial account.

A system of the innovation can include a tag that is associated with a vehicle, the tag is readable to perform associated financial functions. A connection component associates the tag with a financial account and the vehicle, the financial account is associated with a customer that is associated with the vehicle. A transaction component executes a financial transaction between an entity and the customer using the tag associated with the financial account.

A computer readable medium has instructions to control one or more processors. The instructions can include associating a tag with a financial account and the vehicle, the financial account is associated with a customer that is associated with the vehicle, the tag is readable to perform associated financial functions. The instructions can include scanning the tag with a reader, the reader associated with the entity authorized to make charges to the financial account. The instructions can include applying security controls for the tag, the security controls dictate a charge type or authorized creditor for executing transactions. The instructions can include executing a financial transaction between an entity and the customer using the tag associated with the financial account.

In aspects, the subject innovation provides substantial benefits in terms of vehicle based transactions. One advantage resides in more security control over a budget with regards a vehicle. Another advantage resides in seamless payment of financial transactions regarding a vehicle.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 1:
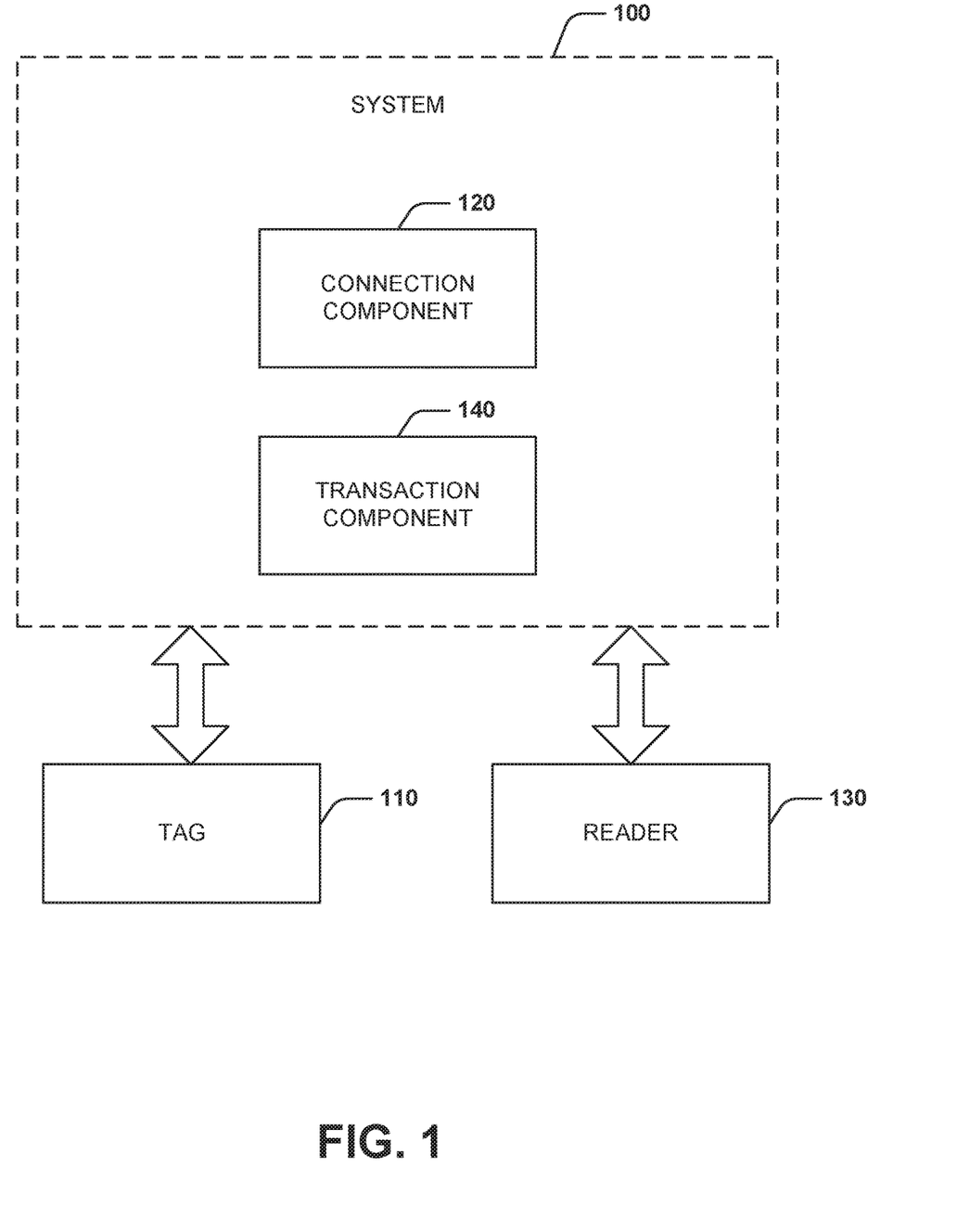
FIG. 1 illustrates an example component diagram of a vehicle based transaction system of the innovation.

FIG. 1 illustrates a system 100 that facilitates vehicle based transactions. As illustrated, the system 100 includes a tag 110. The tag 110 is associated with a vehicle belonging to (or otherwise authorized to) a customer. The tag 110 is readable to perform associated financial functions. The tag 110 can be a radio frequency identification (RFID), near-field communication (NFC), barcode, quick response (QR) code, internet-of-things (JOT) device, smart dust, integrated circuit (IC) chip, and/or the like. The tag 110 is associated with a customer's financial account. In some embodiments, the tag 110 is affixed, integrated, or otherwise associated with a vehicle of the customer such that the tag 110 can be scanned (or otherwise communicated with) to execute financial transactions related to the vehicle.

The system 100 includes a connection component 120. The connection component 120 associates the tag with a financial account of the customer. Additionally the connection component 120 facilitates association of the tag with the vehicle of the customer. The connection component 120 associates the financial account with the customer. In some embodiments, the connection component 120 stores connection data in a centralized database. In other embodiments, the connection component 120 can be integrated with a financial institution to facilitate executing transactions using the tag.

The system 100 can employ a reader 130. In aspects, the reader 130 scans the tag 110 to begin and/or allow an entity to initiate a transaction regarding the vehicle. The reader 130 is associated with the entity authorized to make charges to the financial account. For example, a customer brings a vehicle to a serviceperson who performs an oil change on the vehicle. The serviceperson can scan the tag 110 with the reader 130 to commence payment of the oil change.

In some embodiments, the reader 130 is a hardware device that can scan for tags 110 within a predetermined radius. The reader 130 can extract information from the tag 110. In some embodiments, the tag 110 includes a unique identifier. The reader 130 can extract the unique identifier from the tag 110. The unique identifier identifies the customer, the financial account, the vehicle, and/or the like. In some embodiments, the unique identifier is a hash code, vehicle identification number (VIN), account number, and/or the like.

The system 100 includes a transaction component 140. The transaction component 140 executes a financial transaction between an entity and the customer. When the reader 130 scans the tag 110, the connection component 120 can look up the financial account associated with the tag 110, the customer, the vehicle, and/or the like. The transaction component 140 can access the financial account of the financial institution associated with the customer. The transaction component 140 can execute a transfer from the financial account to an account of the entity. The transaction component 140 applies a debit to the financial account associated with the tag. In some embodiments, the transaction component 140 executes a wire transfer, blockchain transfer, electronic check, and/or the like between the customer's financial account and the entity or entity financial account.

In some embodiments, the transaction component 140 is integrated with the tag 110 and/or the vehicle such that the tag 110 executes the transaction and/or connects with the financial institution via the transaction component 140 integrated with the tag 110. In other embodiments, the transaction component 140 is integrated in the vehicle such as a financial institution provided device or chip within a system or body of the vehicle.

In some embodiments, the transaction component 140 can apply security controls for the tag 110. The security controls can dictate a charge type or authorized creditor for executing transactions. The transaction component 140 can determine a charge type. A charge type is a definition of the charge as it relates to the vehicle. For example, a charge type can be vehicle service, toll, drive through purchase, and/or the like. The transaction component 140 can limit transactions to only approved charge types or charge types only pertaining to the vehicle. For example, the transaction component 140 can block a transaction if the charge type is for a clothing purchase, while allowing a transaction if the charge type is for a tire purchase.

In aspects, a user (or customer) can predetermine different thresholds for transaction types and/or classifications. By way of example and not limitation, a user can approve spending limits based upon most any measurable and definable factor including location, classification/type, designee/driver, time of day, day of week, and/or the like. Further, notifications can be employed and sent to a customer or other designated recipient based upon consummated transactions and/or attempted transactions.

The transaction component 140 can determine a creditor identification. A creditor identification is a definition of the entity as it relates to the vehicle. For example, a creditor identification can be a dealership, gas station, mechanic, toll entity, and/or the like. The transaction component 140 can limit transactions to only authorized creditors. For example, the transaction component 140 can block a transaction if the creditor is a computer store, while allowing a transaction if the creditor is an automobile dealership. In some embodiments, the charge types and/or authorized creditors are pre-authorized by the customer.

In some embodiments, the entity can scan the tag 110 with the reader 130. The transaction component 140 authorizes a service before commencement of a service for the vehicle. The transaction component 140 can receive an estimated debit or estimated cost of the service from the entity via the reader 130, and/or connections component 120. The transaction component 140 can apply a limit to the service via the security controls. The transaction component 140 applies the limit to the service for the debit to the financial account such that the limit cannot be exceeded. In some embodiments, the customer sets a budget for a charge type or authorized creditor. The transaction component 140 generates and sends a notice to the customer when the debit limit is reached. The customer can provide authorization to raise or exceed the debit limit.

The transaction component 140 can receive authorization from the customer through a response to the notification, password, one-time passcode, and/or the like. In some embodiments, the transaction component 140 can authenticate the customer using biometric data. The transaction component 140 can request biometric data of the customer. The transaction component 140 receives biometric data of the customer. The transaction component 140 matches the biometric data to previously stored biometric data of the customer associated with a relative accounts indicated in account information from the connection component 120.

Figure 2:
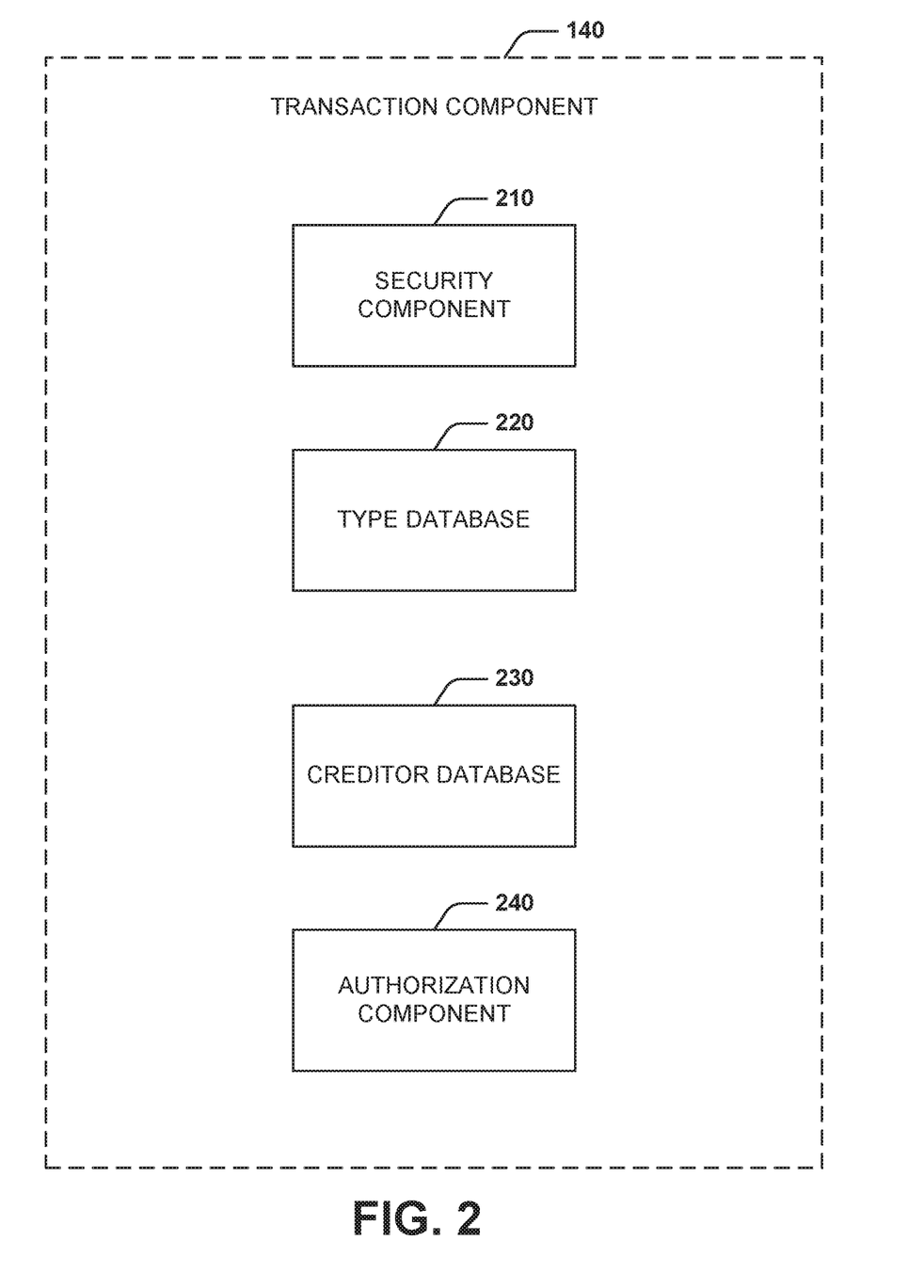
FIG. 2 illustrates an example component diagram of a transaction component.

FIG. 2 illustrates a detailed component diagram of the transaction component 140. The transaction component 140 executes a financial transaction between an entity and the customer. When the reader 130 scans the tag 110, the connection component 120 can look up the financial account associated with the tag 110, the customer, the vehicle, and/or the like. The transaction component 140 can access the financial account of the financial institution associated with the customer. The transaction component 140 can execute a transfer from the financial account to an account of the entity. The transaction component 140 applies a debit to the financial account associated with the tag. In some embodiments, the transaction component 140 executes a wire transfer, blockchain transfer, electronic check, and/or the like between the customer's financial account and the entity.

The transaction component 140 includes a security component 210. The security component 210 applies security controls for the tag 110. The security controls can dictate a charge type or authorized creditor for executing transactions. The transaction component 140 includes a type database or type component 220. The type component 220 determines a charge type. A charge type is a definition of the charge as it relates to the vehicle. For example, a charge type can be vehicle service, toll, drive through purchase, and/or the like. The security component 210 can limit transactions to only approved charge types or charge types only pertaining to the vehicle. For example, the security component 210 can block a transaction if the charge type is for a clothing purchase, while allowing a transaction if the charge type is for a tire purchase.

The transaction component 140 includes a creditor database or creditor component 230. The creditor component 230 determines a creditor identification. A creditor identification is a definition of the entity as it relates to the vehicle. For example, a creditor identification can be a dealership, gas station, mechanic, toll entity, and/or the like. The security component 210 can limit transactions to only authorized creditors. For example, the security component 210 can block a transaction if the creditor is a computer store, while allowing a transaction if the creditor is a dealership. In some embodiments, the charge types and/or authorized creditors are pre-authorized by the customer.

In some embodiments, the entity can scan the tag 110 with the reader 130. The transaction component 140 includes an authorization component 240. The authorization component 240 authorizes a service before commencement of a service for the vehicle. The authorization component 240 can receive an estimated debit or estimated cost of the service from the entity via the reader 130, and/or connections component 120. The security component 210 can apply a limit to the service via the security controls. The security component 210 applies the limit to the service for the debit to the financial account such that the limit cannot be exceeded.

The authorization component 240 generates and sends a notice to the customer when the debit limit is reached. The customer can provide authorization to raise or exceed the debit limit. The authorization component 240 can receive authorization from the customer through a response to the notification, password, one-time passcode, and/or the like. In some embodiments, the authorization component 240 can authenticate the customer using biometric data. The authorization component 240 can request biometric data of the customer. The authorization component 240 receives biometric data of the customer. The authorization component 240 matches the biometric data to previously stored biometric data of the customer associated with a relative accounts indicated in account information from the connection component 120.

Figure 3:
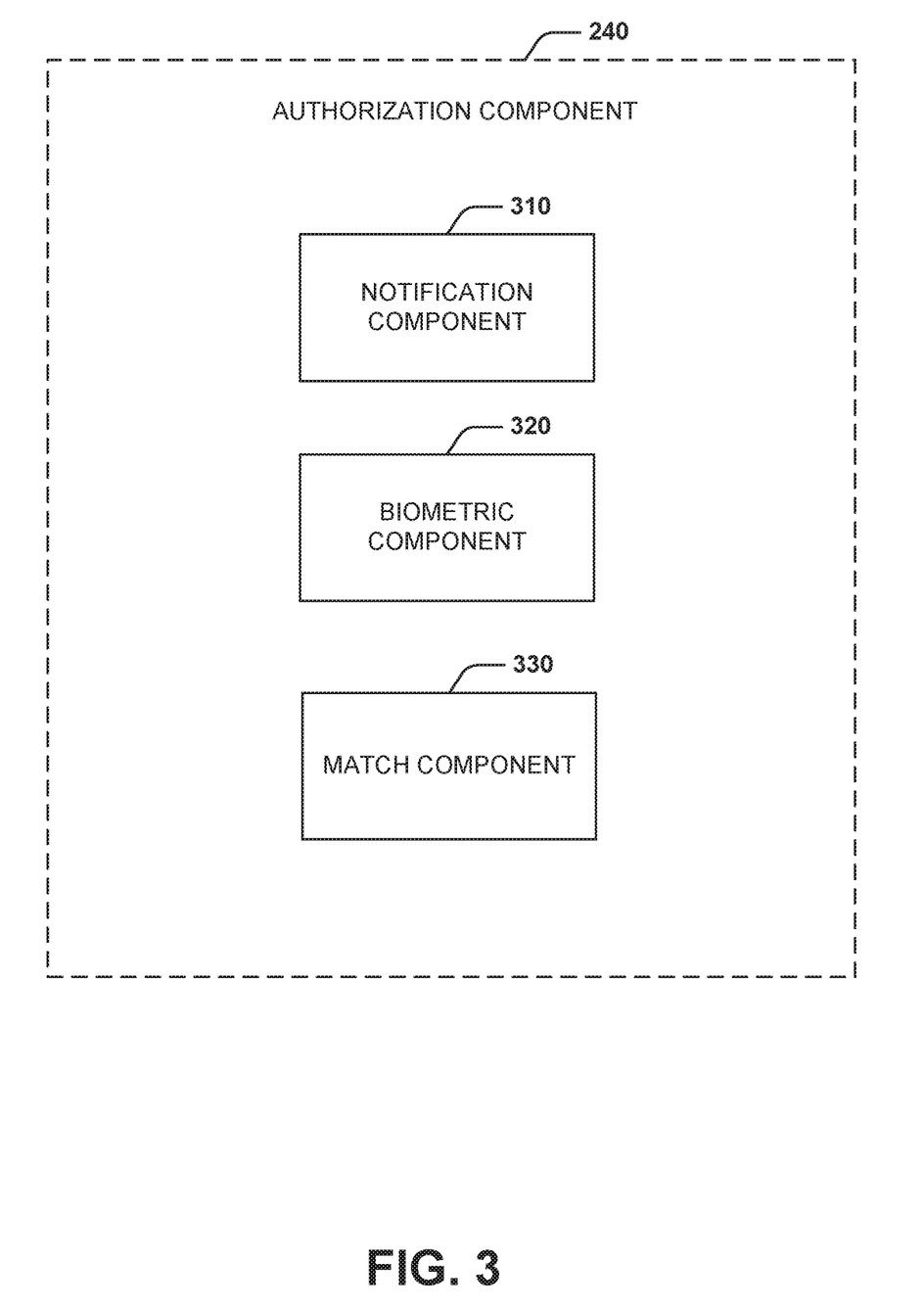
FIG. 3 illustrates an example component diagram of an authorization component.

FIG. 3 illustrates a component diagram of an authorization component 240. The authorization component 240 includes a notification component 310. The notification component 310 generates and sends a notice to the customer when the debit limit is reached. In some embodiments, the notification is a text message (SMS/MMS), one-time passcode, push notification, email, phone call, and/or the like. The customer can provide authorization to raise or exceed the debit limit. The customer can provide authorization to raise or exceed the debit limit. The notification component 310 can receive authorization from the customer through a response to the notification with an affirmative response such as clicking a directed link, sending back an affirmative response, or a returned password, one-time passcode, and/or the like.

In some embodiments, the authorization component 240 can authenticate the customer using biometric data. The authorization component 240 includes a biometric component 320 and a match component 330. The biometric component 320 can request biometric data of the customer. The biometric component 320 receives biometric data of the customer. The match component 330 matches the biometric data to previously stored biometric data of the customer associated with a relative accounts indicated in account information from the connection component 120.

Figure 4:
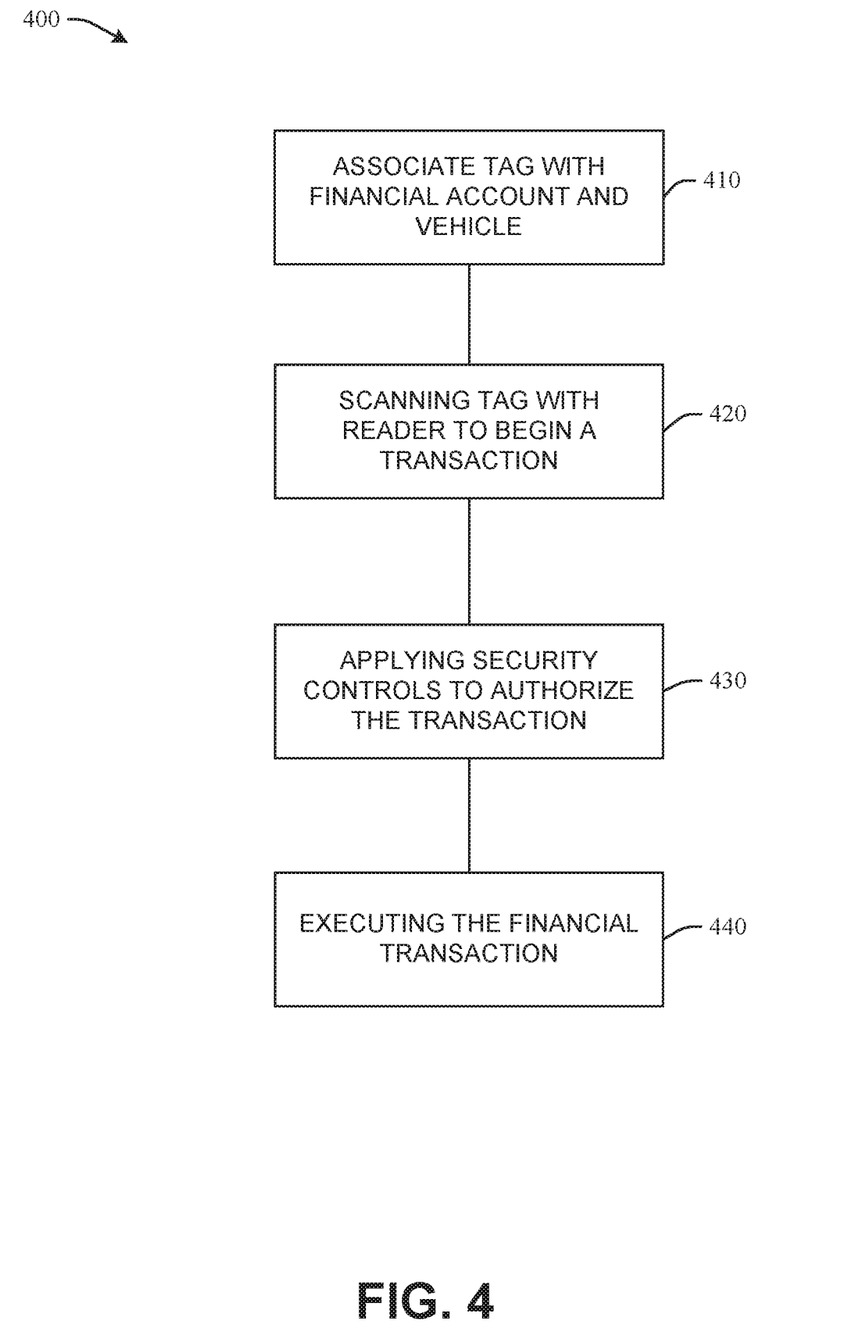
FIG. 4 illustrates a method for vehicle based transactions in accordance with aspects of the innovation.

With reference to FIG. 4, example method 400 is depicted for authenticating a user to verify identity. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 400 is described in conjunction with a specific example is for explanation purposes.

FIG. 4 illustrates a method 400 for vehicle based transactions. At 410, a tag is associated with a financial account and a vehicle. The financial account is associated with a customer that is associated with the vehicle. The tag can be a hardware tag or a digital tag deployed to the vehicle. The tag is readable such that information can be provided by the tag. In some embodiments, the tag can be an RFID, NFC, barcode, QR code, smart dust, IC chip, digital token, and/or the like. At 420, the tag is scanned with a reader. The reader is associated with an entity authorized to make charges to the financial account. The reader can be a hardware device or digital device used to scan tags within a predetermined radius or scan area of the reader.

At 430, security controls are applied for the transaction. For example, the security controls can dictate a charge type or authorized creditor for executing transactions. The security controls can also apply a debit limit for the amount of the transaction or multiple transactions. At 440, a financial transaction is executed between the entity and the customer using the tag associated with the financial account. The financial transaction can be executed by issuing a debit to the customer's financial account.

Figure 5:
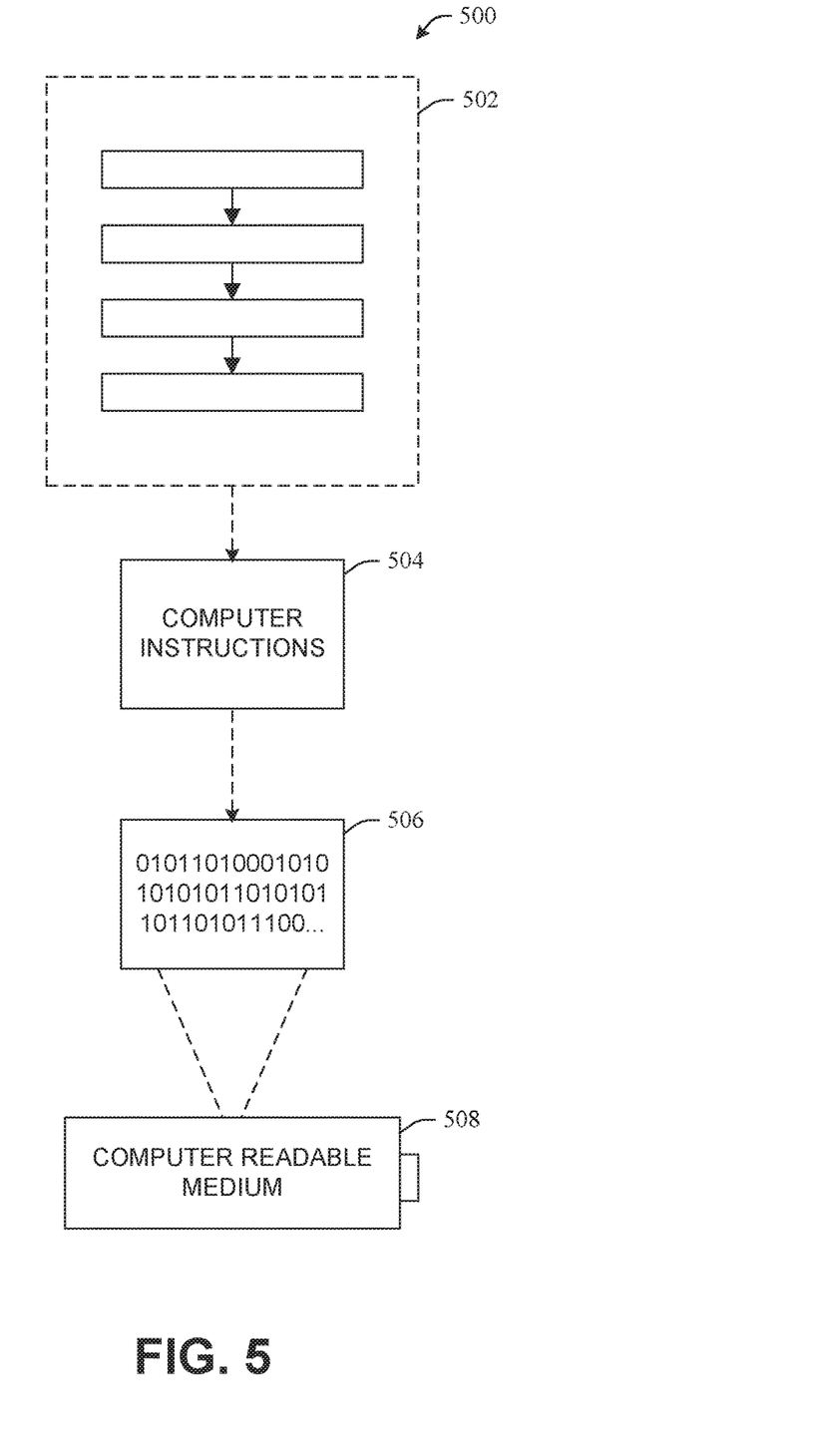
FIG. 5 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 5, wherein an implementation 500 comprises a computer-readable medium 508, such as a CD-R, DVD-R, flash drive, a platter of a hard disk drive, etc., on which is encoded computer-readable data 506. This computer-readable data 506, such as binary data comprising a plurality of zero's and one's as shown in 506, in turn comprises a set of computer instructions 504 configured to operate according to one or more of the principles set forth herein. In one such embodiment 500, the processor-executable computer instructions 504 is configured to perform a method 502, such as at least a portion of one or more of the methods described in connection with embodiments disclosed herein. In another embodiment, the processor-executable instructions 504 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 6:
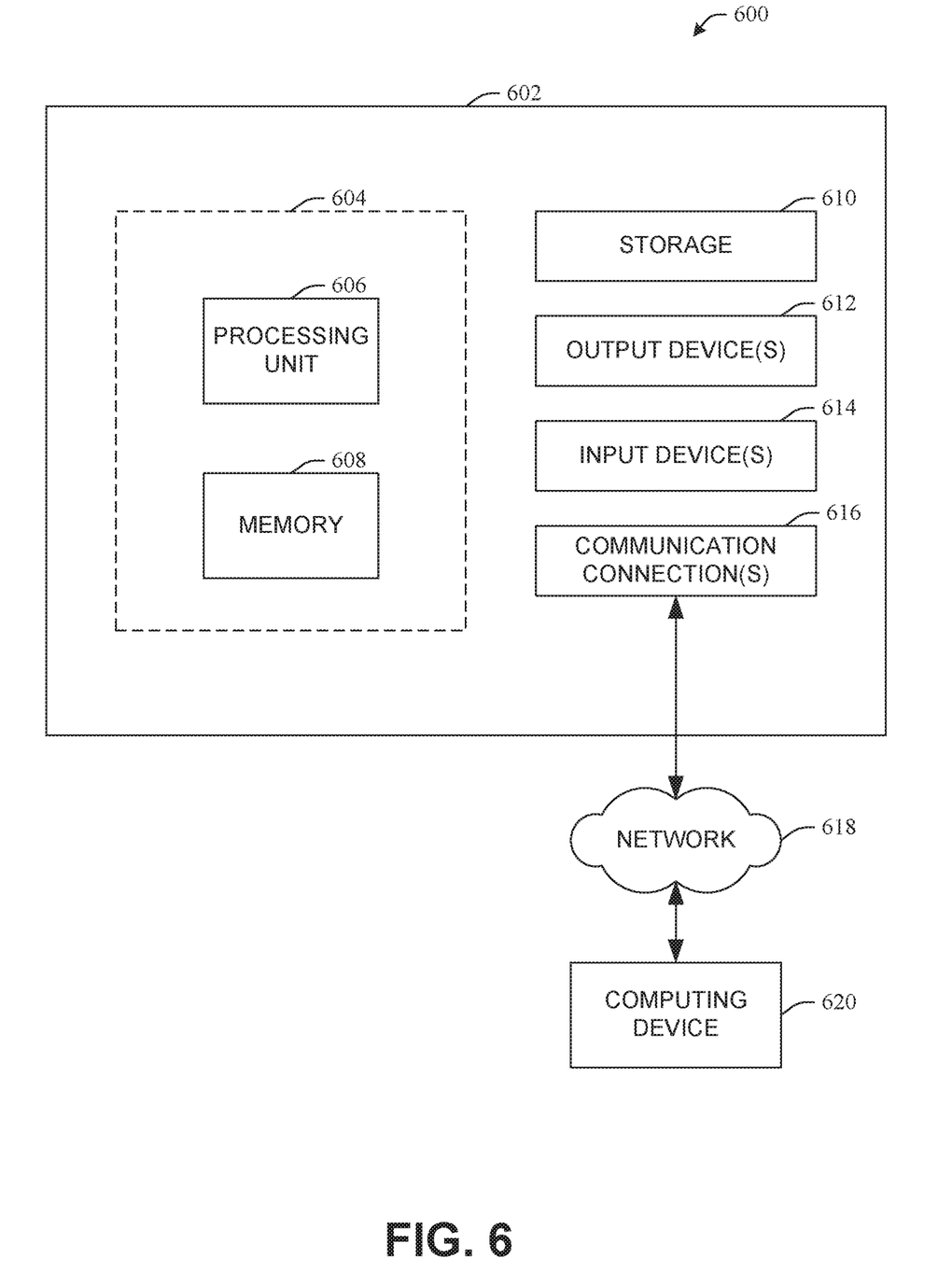
FIG. 6 illustrates a computing environment where one or more of the provisions set forth herein can be implemented, according to some embodiments.

With reference to FIG. 6 and the following discussion provide a description of a suitable computing environment in which embodiments of one or more of the provisions set forth herein can be implemented. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 6 illustrates a system 600 comprising a computing device 602 configured to implement one or more embodiments provided herein. In one configuration, computing device 602 can include at least one processing unit 606 and memory 608. Depending on the exact configuration and type of computing device, memory 608 may be volatile, such as RAM, non-volatile, such as ROM, flash memory, etc., or some combination of the two. This configuration is illustrated in FIG. 6 by dashed line 604.

In these or other embodiments, device 602 can include additional features or functionality. For example, device 602 can also include additional storage such as removable storage or non-removable storage, including, but not limited to, magnetic storage, optical storage, and the like. Such additional storage is illustrated in FIG. 6 by storage 610. In some embodiments, computer readable instructions to implement one or more embodiments provided herein are in storage 610. Storage 610 can also store other computer readable instructions to implement an operating system, an application program, and the like. Computer readable instructions can be accessed in memory 608 for execution by processing unit 606, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media can be part of device 602.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 602 can include one or more input devices 614 such as keyboard, mouse, pen, voice input device, touch input device, infrared cameras, video input devices, or any other input device. One or more output devices 612 such as one or more displays, speakers, printers, or any other output device can also be included in device 602. The one or more input devices 614 and/or one or more output devices 612 can be connected to device 602 via a wired connection, wireless connection, or any combination thereof. In some embodiments, one or more input devices or output devices from another computing device can be used as input device(s) 614 or output device(s) 612 for computing device 602. Device 602 can also include one or more communication connections 616 that can facilitate communications with one or more other devices 620 by means of a communications network 618, which can be wired, wireless, or any combination thereof, and can include ad hoc networks, intranets, the Internet, or substantially any other communications network that can allow device 602 to communicate with at least one other computing device 620.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed:

1. A method, comprising:
    affixing a tag to a vehicle, the tag is readable to perform associated financial functions;
    associating the tag with a financial account and the vehicle, the financial account is associated with a customer that is associated with the vehicle; and
    executing a financial transaction between an entity and the customer using the tag associated with the financial account, wherein executing the financial transaction comprises:
        scanning the tag with a near-field communication (NFC) reader, the NFC reader associated with the entity authorized to make charges to the financial account to determine details of the financial transaction including the entity, the customer, and an item or service;

determining account information of the customer based on the scanning of the tag by the NFC reader;
determining a charge type based on the entity or the item or service;
applying security controls for the tag and the financial transaction, wherein the security controls dictate at least two authorized charge types and at least two authorized creditors for executing transactions, wherein the security controls limit charge types to debit transactions associated with vehicle transactions, wherein the charge types or authorized creditors are preauthorized by the customer;
authorizing the financial transaction if the charge type is associated with a vehicle transaction that is associated with a customer operating a vehicle; and
blocking the financial transaction if the charge type is not associated with a vehicle transaction associated with a customer operating a vehicle;
wherein the financial transaction is a service;
applying second security controls for the service, comprising:
receiving an estimated debit of the service from a service provider before the service has commenced by scanning the tag;
authorizing the service to commence if the estimated debit complies with a service limit amount, wherein the service limit amount is a threshold for amount of money to spend on services to the vehicle;
applying the service limit amount to the service for the estimated debit to the financial account while the service is being performed;
generating and sending a notice over a communication network to the customer when the service limit amount is reached, wherein generating the notice comprises generating a directed link, wherein opening the directed link automatically authorizes the service limit amount to be exceeded; and
receiving an authorization from the customer to exceed the service limit amount by the customer opening the directed link.

2. The method of claim 1, the executing comprising:
applying a debit to the financial account associated with the tag.

3. The method of claim 1,
wherein the tag is a near-field communication (NFC) code associated with the financial account.

4. The method of claim 1,
wherein the authorized creditors are at least two of a vendor, a dealer, a gas station, or a toll entity.

5. The method of claim 1, wherein the financial account is one of a prepaid account, credit card account, or checking account.

6. The method of claim 1,
wherein the security controls further include a location limit, a time limit, and a day of week limit.

7. A system, comprising:
a processor that executes the following computer executable components stored in a memory:
a tag that is associated with a vehicle, the tag is readable to perform associated financial functions;
a connection component that associates the tag with a financial account and the vehicle, the financial account is associated with a customer that is associated with the vehicle;
a transaction component that executes a financial transaction between an entity and the customer using the tag associated with the financial account;
a near-field communication (NFC) reader that scans the tag, the NFC reader associated with the entity authorized to make charges to the financial account to determine details of the financial transaction including the entity, the customer, and an item or service;
wherein the transaction component determines account information of the customer based on the scanning of the tag with the NFC reader;
a type component that determines a charge type based on the entity or the item or service; and
a security component that applies security controls for the tag and the financial transaction, wherein the security controls dictate at least two authorized charge types and at least two authorized creditors for executing transactions, wherein the security controls limit charge types to debit transactions associated with vehicle transactions, wherein the charge types or authorized creditors are pre-authorized by the customer;
wherein the transaction component authorizes the financial transaction if the charge type is associated with a transaction that is associated with a customer operating a vehicle; and
wherein the transaction component blocks the financial transaction if the charge type is not associated with a transaction associated with a customer operating a vehicle;
wherein the financial transaction is a service;
wherein the security component applies second security controls for the service, comprising:
receiving an estimated debit of the service from a service provider before the service has commenced by scanning the tag;
authorizing the service to commence if the estimated debit complies with a service limit amount, wherein the service limit amount is a threshold for amount of money to spend on services to the vehicle;
applying the service limit amount to the service for the estimated debit to the financial account while the service is being performed;
generating and sending a notice over a communication network to the customer when the service limit amount is reached, wherein generating the notice comprises generating a directed link, wherein opening the directed link automatically authorizes the service limit amount to be exceeded; and
receiving an authorization from the customer to exceed the service limit amount by the customer opening the directed link.

8. The system of claim 7, the executing comprising:
wherein the transaction component applies a debit to the financial account associated with the tag.

9. The system of claim 7,
wherein the tag is a near-field communication (NFC) code associated with the financial account.

10. The system of claim 7, wherein the authorized creditors are at least two of a vendor, a dealer, a gas station, or a toll entity.

11. The system of claim 7, the transaction component comprising an authorization component, the authorization component comprising:
a biometric component that receives biometric data of the customer; and
a match component that matches the biometric data to previously stored biometric data of the customer associated with the financial account indicated.

12. The system of claim 7,
wherein the security controls further include a location limit, a time limit, and a day of week limit.

13. The system of claim 7,
wherein the customer pre-authorizes different thresholds for each security control of the security controls.

14. A non-transitory computer readable medium having instructions to control one or more processors configured to:
associate a tag with a financial account and a vehicle, the financial account is associated with a customer that is associated with a vehicle, the tag is readable to perform associated financial functions;
scan the tag with a near-field communication (NFC) reader, the NFC reader associated with an entity authorized to make charges to the financial account to determine details of a financial transaction including the entity, the customer, and an item or service;
determine account information of the customer based on the scanning of the tag with the NFC reader;
determine a charge type based on the entity or the item or service;
apply security controls for the tag and the financial transaction, wherein the security controls dictate at least two charge types and at least two authorized creditors for executing transactions, wherein the security controls limit charge types to debit transactions associated with vehicle transactions, wherein the charge types or authorized creditors are pre-authorized by the customer; and
authorize the financial transaction if the charge type is associated with a transaction that is commonly associated with a customer operating a vehicle;
block the financial transaction if the charge type is associated with a transaction that is not commonly associated with a customer operating a vehicle, wherein the financial transaction is a service;
apply second security controls for the service, comprising:
receiving an estimated debit of the service from a service provider before the service has commenced by scanning the tag;
authorizing the service to commence if the estimated debit complies with a service limit amount, wherein the service limit amount is a threshold for amount of money to spend on services to the vehicle;
applying the service limit amount to the service for the estimated debit to the financial account while the service is being performed;
generating and sending a notice over a communication network to the customer when the service limit amount is reached, wherein generating the notice comprises generating a directed link, wherein opening the directed link automatically authorizes the service limit amount to be exceeded; and
receiving an authorization from the customer to exceed the service limit amount by the customer opening the directed link; and
execute a financial transaction between an entity and the customer using the tag associated with the financial account if the financial transaction is authorized.

15. The non-transitory computer readable medium of claim 14,
wherein the security controls further include a location limit, a time limit, and a day of week limit, wherein the customer pre-authorizes different thresholds for each security control of the security controls.

16. The method of claim 1,
wherein the customer pre-authorizes different thresholds for each security control of the security controls.

* * * * *